United States Patent [19]

Catalano

[11] Patent Number: 5,061,531

[45] Date of Patent: Oct. 29, 1991

[54] GLAZING UTILIZING RIM PROCESS TO PRODUCE SEALED AND FRAMED INSULATING GLASS UNIT

[75] Inventor: Gennaro J. Catalano, Washington Crossing, Pa.

[73] Assignee: M. L. Burke, Co., Union City, Calif.

[21] Appl. No.: 451,269

[22] Filed: Dec. 15, 1989

Related U.S. Application Data

[63] Continuation of Ser. No. 221,503, Jul. 18, 1988, abandoned.

[51] Int. Cl.[5] ........................ E06B 3/24; C03C 27/00; E04C 2/54

[52] U.S. Cl. ........................ 428/34; 428/192; 428/423.1; 156/107; 156/109; 52/788; 52/790; 264/28.1; 264/271.1; 264/252; 264/241

[58] Field of Search ........................ 428/34, 192, 423.1; 156/107, 109, 304; 52/176, 122, 788-790; 264/252, 271.1, 279.1, 314, 241, 328.1; 425/542, 543, 110, 116, 112, 121

[56] References Cited

U.S. PATENT DOCUMENTS

| | | | |
|---|---|---|---|
| 4,626,185 | 12/1986 | Monet | 425/110 |
| 4,662,113 | 5/1987 | Weaver | 264/300 |
| 4,669,241 | 6/1987 | Kelly | 156/109 |
| 4,807,419 | 2/1989 | Hodek et al. | 52/172 |
| 4,822,649 | 4/1989 | Canaud et al. | 52/788 |
| 4,909,875 | 3/1990 | Canaud et al. | 156/109 |

FOREIGN PATENT DOCUMENTS

| | | | |
|---|---|---|---|
| 2594479 | of 0000 | France . | |
| 8605541 | 9/1980 | PCT Int'l Appl. | 264/261 |

*Primary Examiner*—James J. Seidleck
*Assistant Examiner*—Donald J. Loney
*Attorney, Agent, or Firm*—John J. Simkanich

[57] ABSTRACT

An insulating architectual glass unit for residential, nonresidential and commercial applications having at least two panes of glass plate separated by an encapsulated air space is constructed with an injection molded frame of relatively low thermal conductivity material wherein a secondary seal between the individual glass plates and a frame structure surrounding the glass plates are molded as a single piece continuous structure in a single step operation.

12 Claims, 2 Drawing Sheets

GLAZING UTILIZING RIM PROCESS TO PRODUCE SEALED AND FRAMED INSULATING GLASS UNIT

This application is a continuation application of pending application Ser. No. 221,503, filed July 18, 1988 now abandoned.

BACKGROUND OF THE INVENTION

This invention relates to residential, non-residential and commercial architectural glazing and in particular to types of glazing utilizing insulating glass where this insulation feature is created by a captive air space between panes of glass plate.

Further, this invention relates to glazing where a rim structure or frame enclosure is molded to the glass plate.

Thermopane has become the trademark for a brand of insulating architectural glass where two panes of glass are united in a single structure with an insulating pocket of captive air space therebetween.

This insulating glass structure includes an edge spacer which holds the two panes apart. A primary seal is used between the spacer surfaces and the respective mating surfaces of the panes. A secondary seal of silicone or polysulfide mastic material encapsulates the perimeter edge of the structure and bonds to the edges of each pane and to the spacer. Both the primary seal and the secondary seal are applied as a paste or gel-like substance which air cures.

These insulating glass assemblies are installed in architectural applications by classic and well-known framing methods similar if not identical to single pane framing methods utilizing caulk, putty or window glaze materials and trim metal pieces, and/or metal molding. A metal frame was of necessity used in these prior assemblies. The metal frame provided a good thermal transmission surface or "edge effect". In typical window installations this thermal transmission surface can account for 10–15 percent of the window and frame surface area thereby reducing the insulating properties of the installation.

Curtze, U.S. Pat. No. 4,543,283, shows an encapsulated glazing product laminate used in automobiles. This product incorporates a glass sheet which has bonded to it on one side an inner layer of soft plastic sheet material and bonded over this soft plastic sheet material an anti-lacerative plastic protective sheet. A synthetic polymer frame is molded around the edge of this laminated structure. It is required that the polymer frame be in contact with the surface of the outer plastic sheet for adherence.

While Curtze shows a RIM (reaction injection molding) process manufactured frame, he expressly requires a pre-stressed relationship between his RIM frame and his outer plastic sheet to create a safety glass.

The Curtze frame member is recited to act as a gasket or perimeter stress (belt) device and not as a frame in the classic architectural sense of "window frame".

RIM process materials have been utilized by Saint-Gobain Vetrag, Fr 2,594,479 for double glazing panels. In this instance, a primary seal of butyl rubber mastic is used between the spacer and the glass panes of double glazing panels as has been done for more than a decade and is described above. The Saint-Gobain secondary seal covers the spacer and the edges of the glass panes as in the previous art. However, the prior secondary seal which air cures has been replaced by an identically shaped and sized secondary seal which chemically cures, thereby speeding up the manufacturing process.

SUMMARY OF THE INVENTION

The present invention is intended to go beyond the prior art to provide a structure which is more easily installed in buildings. An architectural frame is incorporated as an integral part of an insulating type double glaze window structure thereby eliminating previously required architectural glazing and framing installation materials and reducing installation work.

The frame itself forms the secondary seal member of the insulating double glaze structure. This secondary seal member adheres directly to the glass surfaces without the need for plastic interfacing sheet material. This is accomplished by a proper selection of the secondary seal member material and a preparation of the glass surface to which it is to adhere.

The frame and secondary seal members are formed as a single continuous member of reaction injection material which chemically cures faster and to a harder state than previously used secondary seal members such as air cured silicone or polysulfide materials. A more complete thermal break is created and a thermal transmission through the frame ("edge effect") is reduced or eliminated.

DESCRIPTION OF THE DRAWINGS

The features, advantages and operation of the invention will better be understood from a reading of the following Detailed Description of the Invention in connection with the accompanying drawings, in which like numerals refer to like elements, and in which.

DETAILED DESCRIPTION OF THE INVENTION

Insulating architectual glass units, like single panes of glazing have required custom structural framing for architectual installation. This architectural structural framing whether assembled at the site or partially factory preassembled has required large quantities of finish time by the installers.

Typically, such insulating glazing requires a composite architectural structural framework which first incorporates a rough frame structure tied into the architecture of the building. Secondly, a curb frame or secondary frame is built upon this rough frame for receiving the glazing and then finish molding or the like is installed to hold glazing into the framing structure. Caulk, weather stripping and the like are installed in situ. Such installation demands skill and is time consuming.

Figure 1:
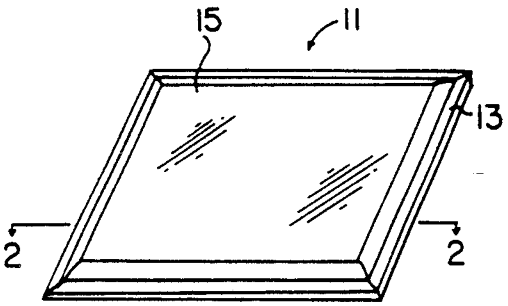
FIG. 1 is a perspective view of the invention assembled as an architectural double glazed window constructed with an integral frame.

The present invention is an insulating architectural glass unit 11, FIG. 1, having a finished architectural structural frame 13 molded to the glass plate 15 during factory manufacture and prior to installation in the architectural structure (building).

Figure 2:
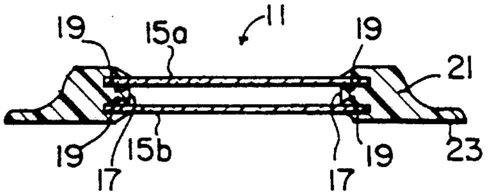
FIG. 2 is a cross section of the double glazed window of FIG. 1 taken as shown in FIG. 1.

This glass unit 11, FIG. 2, has a pair of glass plate sections 15*a*, 15*b* held apart by aluminum, plastic or fiberglass separator strips 17. These materials are all impervious to moisture. A primary seal 19 of butyl rubber or other suitable material is used between the surfaces of each separator strip 17 and each glass plate 15*a*, 15*b*.

A thermoplastic frame 21 of polyurethane or other material is molded about the edge of each glass plate 15*a*, 15*b* to completely cover the edge of each plate and to cover the periphery of the glass unit assembly including each separator strip 17 the separator strip joints and the primary seal 19.

This frame 21 thereby also forms the secondary seal member for the insulating glass unit 11. This secondary seal member will be discussed further below.

The frame 21 is shaped to have a protruding flange portion 23 which forms a nailing surface or a pinch surface or a compression surface for installation with additional finish molding which can be later added as a matter of choice by the builder.

The shape of the frame 21 including its protruding flange 23 is determined by mold dies utilized at the place of manufacture of the unit. Typically, the frame 21 is made using a reaction injection molding process (RIM). Such a RIM process will allow curing of the thermoplastic frame 21 material without the use of excessive heat and which therefore will not distort the assembly of the glass plates 15*a*, 15*b*, spacer 17 and primary seal 19. The RIM process utilizes molding forces of only about 40 p.s.i. as opposed to standard injection molding forces in the range of about 230 p.s.i.

Figure 2A:
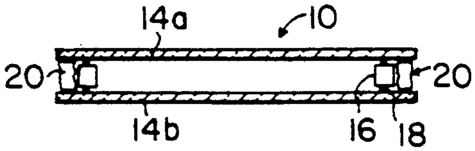
FIG. 2A PRIOR ART
FIG. 2*a* is a cross section of the prior art assembly for a double glazed window.

An immediate benefit of the present invention is that it allows a plural glazed architectural glass unit to be made with an integral architectural structural frame molded as a single structure. In contrast to this invention, the prior art, FIG. 2*a*, has been a plural glazed unit 10 having a first and a second glass plate 14*a*, 14*b* held apart by separators 16. The separator 16 surfaces are sealed to the face of the glass plates 14*a*, 14*b* with a primary seal material 18. A secondary seal 20, which is actually an edge seal, covers the side edge of the assembly and seals the joints of the separator 16 pieces. This secondary seal 20 also adds limited support to the separator pieces 16.

In the present invention the frame 21 forms the secondary seal 25 which must be included with double glazed units. This secondary seal region 25, FIG. 3*a*, replaces the prior art secondary seal 20. It fills the inside surfaces of the glass plates 15*a*, 15*b* and adheres thereto as well as adhering to the outer surfaces of the spacer 17 and the primary seal 19.

In the prior art the secondary seal 20 was applied as a pliable compound which partially air hardens to a semi-pliable state and which provides some structural integrity to the glass unit by assisting in holding the assembled shape of the unit.

In the present invention, the frame 21 is utilized to incorporate three separate structural functions. These functions are the secondary seal 25, the aesthetic and structural frame area 21*a* and the flange 23. Further, as the frame 21 is not assembled by hand but machine molded and the material selection is of a polyurethane, a somewhat pliable but more rigid material than mastic, a more rigid assembly is created than with the prior art.

While the flange portion 23 is not necessary for many applications, it is quite useful and is advantageous in slope glazing applications such as for skylights.

In prior art units the secondary seal 20 alone was not strong enough to hold the assembly intact for architectural uses. As such, a glazing assembly had to be framed prior to or as part of its installation in an architectural structure. This typically added metal edging.

The present invention provides a plural glaze or even a single glaze architectural glass unit with a frame molded as part of the glazing structure. The frame can be manufactured using supplies provided by Mobay Corporation of Pittsburgh, Pa. including MP 5000 or MP 10000 or other type RIM process molding compound. MP 5000 is a polyurethane elastomer having a density of 62.4 pounds per cubic foot, a Shore D scale hardness of 30, a tensile strength of 1900 p.s.i. and a flexural modulus of 5,000 p.s.i. MP 10000 is a polyurethane elastomer having a density of 62.4 pounds per cubic foot, a Shore D scale hardness of 40, a tensile strength of 2200 p.s.i. and a flexural modulus of 10,000 p.s.i. This compound is a polyurethane material which is molded around the glass.

Adhesion of the polyurethane to the glass sheets 15*a*, 15*b* is enhanced by a preparation of the glass prior to the molding process. Such preparation includes a washing and drying of the glass plate 15*a*, 15*b* and then treating the plate 15*a*, 15*b* surfaces with a coupling agent such as an organosilane ester. This coupling agent material is supplied by Union Carbide Corporation and can be ordered as product number A-1100. When used as a preparation for the surface of the glass plates 15*a*, 15*b*, the A-1100 product can be mixed with isopropyl alcohol in a proportion of two percent to ninty-eight percent alcohol by volume.

Figure 3A:
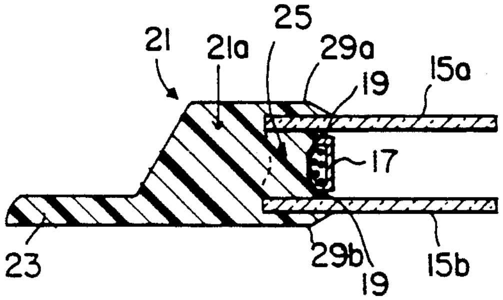
FIG. 3*a* is a side view of a rectangular section taken from the window of FIG. 1 showing the integral frame, glass sheet, spacer and seals.
Figure 3B:
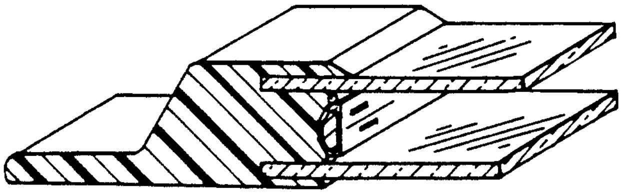
FIG. 3*b* is a perspective view of the rectangular section of FIG. 3*a*.
Figure 4:
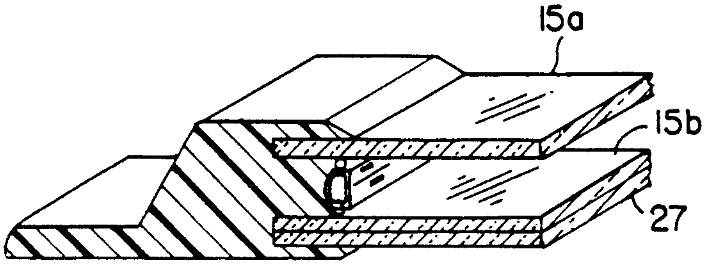
FIG. 4 is a perspective view of a rectangular section of an embodiment incorporating laminate visionary glass.

The rectangular section shown in FIG. 3*a* can be viewed as a perspective view in FIG. 3*b*. An alternate embodiment of FIG. 3*b* is shown in FIG. 4. Here the inside pane 15*b* includes a second sheet of laminate 27 on the outside thereof. The top glass plate 15*a* can be of quarter inch size which has been heat treated or this outer plate 15*a* can be of annealed glass material. The laminate 27 can be laminated glass or as an alternative can be annealed or tempered glass. When the laminate 27 is glass the inside plate 15*b* can be of plastic material. As an alternative both 15*b* and 27 or one of them can be of plastic material.

A laminate assembly, such as shown in FIG. 4, can be used for visionary and nonvisionary architectural applications. It can be opacified for a desired light transmission. As an example, when the plate 15*b* is plastic, this plastic material can be dyed, tinted or coated with metal. Metallic coatings of copper, gold and silver are often used. While a quarter inch thick glass plate was specified above, the thickness of the glass and plastic laminate is variable as a design consideration of the purpose (use) and size of the unit.

The frame member 21 of FIGS. 3*a*, 3*b* and 4 includes a pair of lip members 29*a* and 29*b* which project over the outer surfaces of the glass plates 15*a*, 15*b* or in the case of FIG. 4, plastic sheet 27. These lips form a mechanical encasement as well as an adherent bonding surface of the frame 21 to the glazing members 15*a*, 15*b* and in the laminated embodiment FIG. 4 sheet 27.

Figure 5A:
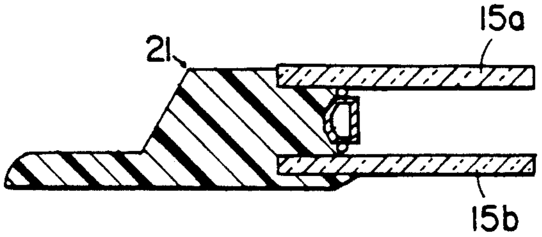
FIG. 5*a* is a side view of a rectangular section taken from an embodiment of the window where the frame member is molded flush with the top surface of the outer glass pane.
Figure 5B:
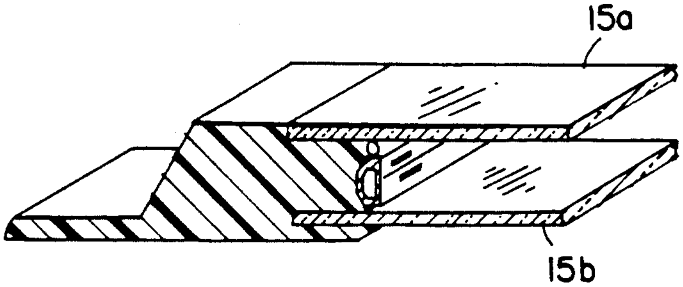
FIG. 5*b* is a perspective view of the rectangular section shown in FIG. 5*a*.
Figure 6:
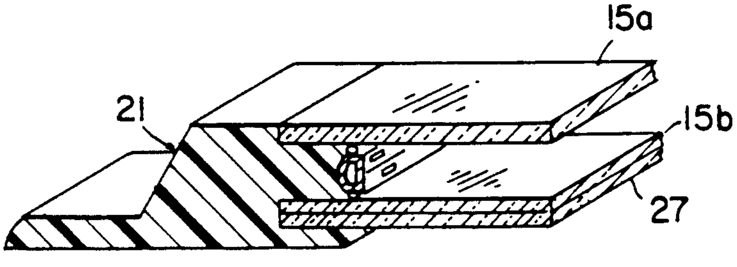
FIG. 6 is a perspective view of a rectangular section of another embodiment incorporating laminate visionary glass.

FIGS. 5*a*, 5*b* and 6 show an alternate embodiment for this frame 21. In this instance, the top lip 29*a* is eliminated and the frame 21 forms a flush surface with the outer face of the outer glass plate 15*a*. This is possible while maintaining the structural strength of the frame where a proper adherence of the frame 21 occurs to the edge surfaces of the plate 15*a*. This is accomplished with a proper preparation of the glass surfaces with the coupling agent prior to the RIM process molding.

Polyurethane provides a desirable structural material for the frame 21 and for an adhesion to the glass sheets 15*a*, 15*b*. It has a high elastic modulus, high moisture proofness and good resistance to abrasion as well as good weathering characteristics and has a crystalline structure.

This last physical characteristic, the crystalline structure, provides a key to a molecular bonding of the polyurethane frame 21 to the glass in the presence of a coupling agent under the heat of the RIM process.

The polyurethane frame material 21 can be pigmented to a desired color that remains stable. Colors can also be matched to standard color runs. The polyurethane utilized for this frame 21 has been ultraviolet stabilized to retard discoloring.

The molecular bonding of the frame 21 to the glass plate 15*a*, 15*b* and/or 27 as well as the single structure for the frame 21 and the secondary seal 25 provides a vibration dampening effect upon the glass plates 15*a*, 15*b* and/or 27. As a result, the present invention causes these plates to be dampened and to vibrate less than in other types of structures. Sound transmission therefore is reduced. This feature is not available in standard framing architectural units as normal glazing and weather stripping necessary for those types of installations allows the individual glass plates 15*a*, et. al to be more structurally resonant and to vibrate in place to a greater degree than with the structure of the present invention.

The design of the present invention causes the glass plates 15*a*, 15*b* and/or 27 to be embedded into the frame material 21 which covers the outer edges of the glass plates 15*a*, 15*b* and is in bonded contact therewith. The frame 21 material applies a very slight compression force to the edges of the glass plates 15*a*, 15*b* as a result of the molding process. As the frame material 21 has different harmonic properties than the glass plate 15*a*, 15*b* and/or 27*a*, the result is that vibrations set up in the glass plates 15*a*, 15*b* are quickly dampened out or deadened by frame 21. The present invention provides improved sound insulation.

Another advantage of the present invention is that the integral frame/seal member remains intact so that the "fogging" problem created by broken seals on architectual double glazing units is eliminated.

Changes can be made in the above described invention without departing from the intent and scope thereof. As an example, the size proportions of and shape of the frame 21 can be varied. Plate and sheet thickness can vary. Further, the frame can be made of compound plastic materials wherein the flange member 23 is of a different shape and/or of a different substance or density or flexibility from the main body portion 21*a* and the secondary seal portion 25. Further, the glass plates 15*a*, 15*b*, and/or 27 can be made of float glass or coated glass or pyrolithic or nonpyrolithic glass. Also, acrylic sheet either clear or tinted can be substituted for any of these plates 15*a*, 15*b*, 27.

The spacer 17 can be of material other than an extruded aluminum tube. Likewise, this tube 17 can either be hollow or foam filled.

Further changes can be made in the above invention without departing from the scope and intent thereof. It is intended, therefore, that the above disclosure is to be interpreted as illustrative of the invention and not that the invention is limited to this above description.

What is claimed is:

1. An architectural glazing unit having its own architecturally and structurally independent frame consisting of:

a first glass plate;

a second glass plate spaced from said first glass plate;

a moisture impervious spacer member inserted between said first and second glass plates and separating said first glass plate from said second glass plate, said spacer member having opposite edges adjacent said respective first and glass plates and extending completely about the periphery of said plates;

a primary seal member positioned as an interface member between each opposite edge of said spacer member, which is adjacent each of said first and second glass plates and said respective glass plate, thereby sealing said spacer member to each of said plates; and a frame member having a first portion extending between the juxtaposed faces of said first and second glass plates to cover said juxtaposed plates said spacer member and said primary seal member, whereby a secondary seal member is created as a continuous part of said frame member, said frame member also having a second portion extending outwardly about the periphery of said glass plates to frame said glass plates and thereafter extending outwardly to form an architectural structural member being of sufficient strength and hardness to function as an architectural structural frame nature;

wherein said frame member first and second portions are RIM process material having been formed in situ through a RIM process and wherein there exists a molecular bonding of said frame RIM process material to said glass plates through a single coupling agent, said RIM process material forming said second seal member as well as said frame member and wherein said RIM process material is a polyurethane elastomer having a Shore D scale hardness of at least 30.

2. An insulating architectural glazing assembly having an integral architectural structural frame which reduces the sound transmission/vibration of the glazing, consisting of:

a first glazing plate;

a second glazing plate spaced from said first glazing plate;

a moisture impervious spacer member between said first glazing plate and said second glazing plate, said spacer member establishing the separation distance between said plates and forming a peripheral wall between said plates; and an architectural structural frame member of low thermal transmission formed in situ through a RIM process and surrounding the edges of said first and second glazing plates wherein there exists a molecular bonding of said frame member to said first and second glazing plates through a single coupling agent applied thereto, said frame member having as a part thereof a peripheral wall extending laterally outwardly therefrom, and wherein said frame peripheral wall extends beyond the edges of the glass plates for a length substantially greater than the length of the faces of the glazing plates covered by the frame member, said frame forming to form an architectural structural member establishing the rigid integrity for the assembly which reduces sound transmission/vibration of the glazing and also forming a gas and fluid seal at the edges of said first and second glazing plates and between thereof and at said peripheral wall, said architectural structural frame member being a polyurethane elastomer having a Shore D scale hardness of at least 30.

3. An insulating and reduced sound transmission architectural glazing assembly having an integral architectural structural frame, consisting of:

a first glazing plate;

a second glazing plate spaced from said first glazing plate;

a spacer member between said first glazing plate and said second glazing plate, said spacer member establishing the separation distance between said plates and forming a peripheral wall adjacent the edges of said plates; and a molded polyurethane elastomeric frame member, of low thermal transmission and having a Shore D scale hardness of at least 30, surrounding the edges of said first and second glazing plates and said peripheral wall and extending outwardly therefrom, said frame member being formed through a RIM process and having a flange portion extending in alignment in a plane projecting outwardly from the plane of one of said glazing plates and being suitable for attachment directly to an architectural structure, said frame member and flange portion forming an architectural structural frame, said frame being molecularly bonded to said plate edges and walls through a single coupling agent to form a primary and secondary seal function and being of a different harmonic capacity therefrom to dampen vibrations set up in said first and second glazing plates.

4. The assembly of claim 2 wherein said spacer member has a first continuous face interfacing said first glazing plate and a second continuous face interfacing said second glazing plate; and also including a first seal joining said spacer first continuous face to said first glazing plate and said second continuous face to said second glazing plate, said first seal providing a gas and fluid seal.

5. The assembly of claim 4 wherein said gas and fluid seal formed by said frame member is a secondary seal.

6. The assembly of claim 5 wherein said frame wraps around the edge and onto the outer face of said first and second glazing plates a short distance to form a lip thereon, said lip being in adherence with said glazing.

7. The assembly of claim 6 wherein said coupling agent is an organosilane ester.

8. The assembly of claim 7 wherein said frame member also includes a flange portion extending outwardly completely thereabout.

9. The assembly of claim 3 wherein said spacer member has a first continuous face interfacing said first glazing plate and a second continuous face interfacing said second glazing plate; and also including a first seal joining said spacer first continuous face to said first glazing plate and said second continuous face to said second glazing plate said first seal providing a gas and fluid seal.

10. The assembly of claim 9 wherein said frame member bonding to said first and second glazing plates in combination with its surrounding said peripheral wall of said spacer member forms a secondary seal for said assembly being a gas and fluid seal.

11. The assembly of claim 10 wherein said organosilane ester coupling agent is applied to all of the surfaces of said first and second glazing plates which interface with said polyurethane material.

12. The assembly of claim 11 wherein said coupling agent is applied as a solution of two percent organosilane ester and 98 percent water by volume.

* * * * *

UNITED STATES PATENT AND TRADEMARK OFFICE
CERTIFICATE OF CORRECTION

PATENT NO. : 5,061,531

DATED : October 29, 1991

INVENTOR(S) : Gennaro J. Catalano

It is certified that error appears in the above-identified patent and that said Letters Patent is hereby corrected as shown below:

On the title page:

Correct application number, item [21]:

delete 451,269 add 451,260

Signed and Sealed this

Fourth Day of July, 1995

Attest:

BRUCE LEHMAN

Attesting Officer

*Commissioner of Patents and Trademarks*